(12) United States Patent
Derrick et al.

(10) Patent No.: US 6,240,507 B1
(45) Date of Patent: May 29, 2001

(54) MECHANISM FOR MULTIPLE REGISTER RENAMING AND METHOD THEREFOR

(75) Inventors: John Edward Derrick, Round Rock, TX (US); Soummy A Mallick, San Jose, CA (US); Robert Greg McDonald, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/168,794

(22) Filed: Oct. 8, 1998

(51) Int. Cl.[7] ........................................... G06F 9/30
(52) U.S. Cl. ................................................... 712/217
(58) Field of Search ............................................ 712/217

(56) References Cited

U.S. PATENT DOCUMENTS

| | | |
|---|---|---|
| 4,610,004 | 9/1986 | Moller et al. . |
| 4,892,425 | 1/1990 | Shimizu et al. . |
| 4,980,819 | 12/1990 | Cushing et al. . |
| 5,138,637 | 8/1992 | Fox . |
| 5,315,178 | 5/1994 | Snider . |
| 5,513,363 | 4/1996 | Kumar et al. . |
| 5,852,726 | * 12/1998 | Lin et al. .............................. 712/217 |
| 5,881,305 | * 3/1999 | Walker .................................. 712/217 |

* cited by examiner

Primary Examiner—William M. Treat
(74) Attorney, Agent, or Firm—Winstead Sechrest & Minick P.C.; Bob Carwell

(57) ABSTRACT

An apparatus and method for renaming a plurality of storage register files implemented. A rename register in a unified rename buffer provides temporary storage for instruction operands resulting from the execution of the instruction to the operands being written to an architected register in one of storage register files. A rename map associates the rename register with the corresponding storage register, which may be in any of the storage register files. The rename registers may simultaneously store data values of different types. Rename map entries include a tag which operates to identify the register file containing the storage register.

19 Claims, 4 Drawing Sheets

|   | 222 | 224 | 226 |
|---|---|---|---|
|   | T | Register ID | V |
| 220 { |   |   |   |
|   |   |   |   |
|   | ⋮ | ⋮ | ⋮ |
|   |   |   |   |

|   | 232 | 234 | 236 | 238 |
|---|---|---|---|---|
|   | T | Register ID | Rename ID | V |
| 230 { |   |   |   |   |
|   |   |   |   |   |
|   | ⋮ | ⋮ | ⋮ | ⋮ |
|   |   |   |   |   |

|   | Register Data |
|---|---|
| 240 { | ⋮ |
|   |   |

MECHANISM FOR MULTIPLE REGISTER RENAMING AND METHOD THEREFOR

TECHNICAL FIELD

The present invention relates in general to a data processor, and in particular, to storage register renaming and temporary storage in a data processor.

BACKGROUND INFORMATION

Data processors having superscalar architectures have the capability of dispatching multiple instructions simultaneously. In such data processors, operations having segregated functionality may be simultaneously dispatched if the candidate instructions are destined for distinct execution units. That is, instructions operating on floating point operands are segregated from fixed-point operations and performed by a floating point unit. The fixed-point operations are executed by a fixed-point unit, and load and store operations are further segregated and performed by a load/store unit. Superscalar processor 100 according to the prior art is illustrated, in block diagram form, in FIG. 1. Instructions are retrieved from memory (not shown) and loaded into I-cache 101. The instructions are retained in I-cache 101 until they are required, or flushed it not needed. Instructions are retrieved from I-cache 101 by fetch unit 102 and loaded into instruction queue 103.

The parallelism of processor 100 includes instruction pipelining whereby instructions are processed in stages. In such an architecture, multiple instructions may be contained in a pipeline, each such instruction being in a different processing stage at a given processor cycle. When a pipeline, such as fixed-point pipeline 105 or floating point pipeline 106, has an available slot, dispatch unit 104 dispatches a next instruction in instruction queue 103 to the appropriate execution pipeline. In processor 100, dispatch unit 104 may dispatch two instructions simultaneously, provided that one of the instructions is bound for fixed-point pipeline 105 and the other is bound for floating point pipeline 106. Alternatively, a load/store instruction may be simultaneously dispatched with an instruction bound for either fixed-point pipeline 105 or floating point pipeline 106.

In addition to instruction execution parallelism, processor 100 implements out-of-order instruction execution to further improve performance. Although instructions are dispatched by dispatch unit 104 in program order, they may be issued from an issue queue such as fixed-point issue queue 107 or floating point issue queue 108, as appropriate, out of program order. An instruction may be issued ahead of a prior instruction, in program order, as soon as all of its operand dependencies have been resolved. That is, as soon as all of its source operands have become available because the instruction generating them has finished its execution.

Out-of-order execution may begin before the source operand has been written back to its destination architected register in general purpose register (GPR) file 109 or floating point register (FPR) file 110. The result from a fixed-point calculation from fixed-point unit 111 and the result of a floating point calculation from floating point unit 112 are written back to the corresponding architected register file, GPR file 109 and FPR file 110, respectively, when the instruction generating the result completes.

Completion is effected by completion unit 113 which re-orders instructions executed out-of-order. When a particular instruction completes, the architected machine state is as if that instruction, and all prior instructions, were executed in program order. In-order completion ensures that processor 100 has the correct architectural state if it must recover from an exception or a branch that has executed speculatively. Because the completion of a particular instruction may occur several cycles after its execution, a rename mechanism is provided to temporarily store operand results prior to their being written back to the architected register at completion.

Rename buffers are used to provide temporary storage for operands generated by instructions that have finished execution but not yet completed. Rename buffer 113 is associated with GPR file 109, for fixed-point instructions in fixed-point pipeline 105. Similarly, rename buffer 114 is associated with FPR file 110 for floating point instructions in floating point pipeline 106.

When an instruction is dispatched by dispatch queue 103 to either fixed-point issue queue 107 or floating point issue queue 108 for fixed-point and floating point instructions, respectively, a renaming mechanism associates a register in the rename buffer with the target architected register. For fixed-point operations, the renaming is provided by GPR renaming logic 115. Similarly, renaming for floating point instructions is generated by FPR renaming logic 116. When an instruction sourcing the renamed architected register is dispatched by dispatch unit 104, GPR renaming logic 115 and FPR renaming logic 116, for fixed-point and floating point instructions, respectively, provide the rename data to the instruction. This is tagged along with the instruction when the instruction enters fixed-point issue queue 107, for fixed-point instructions, or floating point issue queue 108, for floating point instructions. When the instruction issues, it then uses the renaming data to retrieve the source operands from rename buffer 113, for fixed-point instructions, and rename buffer 114 for floating point instructions.

Processor 100, according to the prior art, maintains separate fixed-point registers and floating point registers, GPR file 109 and FPR file 110, respectively. The separate register files each have their own associated rename buffer, rename buffer 113 for GPR file 109, and rename buffer 114 for FPR file 110. In processor 100, in accordance with the prior art, only a small number of instructions may be executed out-of-order. The number of instructions which may be executed out-of-order are limited by the number of registers available in rename buffers 113 and 114. In order that more instructions may be executed out-of-order, there is a need in the art for a mechanism by which temporary storage may be increased without expending chip resources on unnecessarily duplicative storage Moreover, increased parallelism, and the resulting improvements in performance, militate in favor of facilities for dispatching multiple fixed-point or multiple floating point instructions in the same cycle. This may exacerbate the temporary storage problem if multiple execution pipelines, such as fixed-point pipeline 105 and floating point pipeline 106 are duplicated to provide increased parallelism. Thus, there is a need in the art for a rename mechanism that accommodates increased parallelism without unnecessarily duplicating temporary storage.

SUMMARY OF THE INVENTION

The previously mentioned needs are addressed with the present invention. Accordingly, there is provided, in a first form, an apparatus for renaming a plurality of storage devices. The apparatus includes a first register file containing a plurality of first entries and a second register file containing a plurality of second entries. A rename file containing a plurality of third entries is also included. A third entry is operable for association with an entry in one of the first register file and the second register file.

There is also provided, in a second form, a method of multiple register renaming. The method includes selecting for accessing one of first and second register files in response to a predetermined data value. A preselected entry in a rename file having a plurality of entries is associated with a preselected entry in the one of said first and second register files from the selecting step.

Additionally, there is provided, in a third form, a data processing system. The data processing system includes an instruction queue adapted for receiving a plurality of instructions from a memory device and a dispatch queue for sending an instruction from the instruction storage device to an execution unit for execution. A rename mechanism is provided for associating a temporary storage device for receiving a data value connected with the instruction with an architected storage register for the receiving data value. The rename mechanism includes a first register file containing a plurality of first entries, a second register file containing a plurality of second entries, and a rename file containing a plurality of third entries, wherein each third entry is associated with a preselected entry in either the first register file or the second register file. A portion of each of the first and second entries is operable for receiving an operand value associated with an instruction in the plurality of instructions from the third entry.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 2B illustrates, in schematic form, a rename table in accordance with an embodiment of the present invention;

FIG. 2C illustrates, in schematic form, an issue queue in accordance with an embodiment of the present invention;

FIG. 2D illustrates, in schematic form, a rename file in accordance with an embodiment of the present invention.

DETAILED DESCRIPTION

Figure 1:
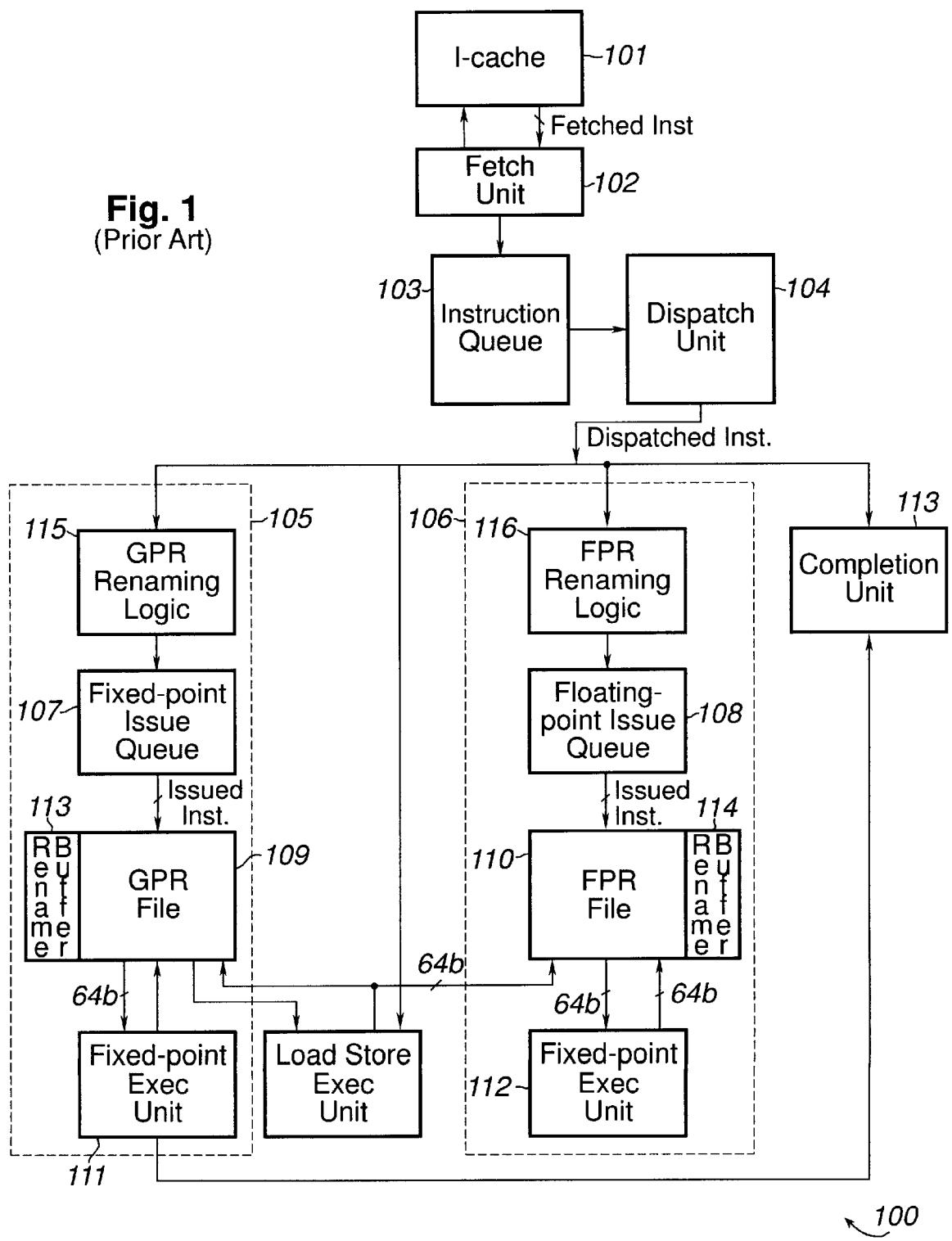
FIG. 1 illustrates, in block diagram form, a processor in accordance with the prior art.

The present invention provides a rename mechanism that permits a plurality of register files to share a common rename buffer. The rename buffer serves to rename multiple architected register files wherein different register files operate to store instruction operands of different data types, such as fixed-point operands and floating point operands. The rename mechanism of the present invention may also rename other sets of architected registers, such as a link register, control register, and counter register.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2A:
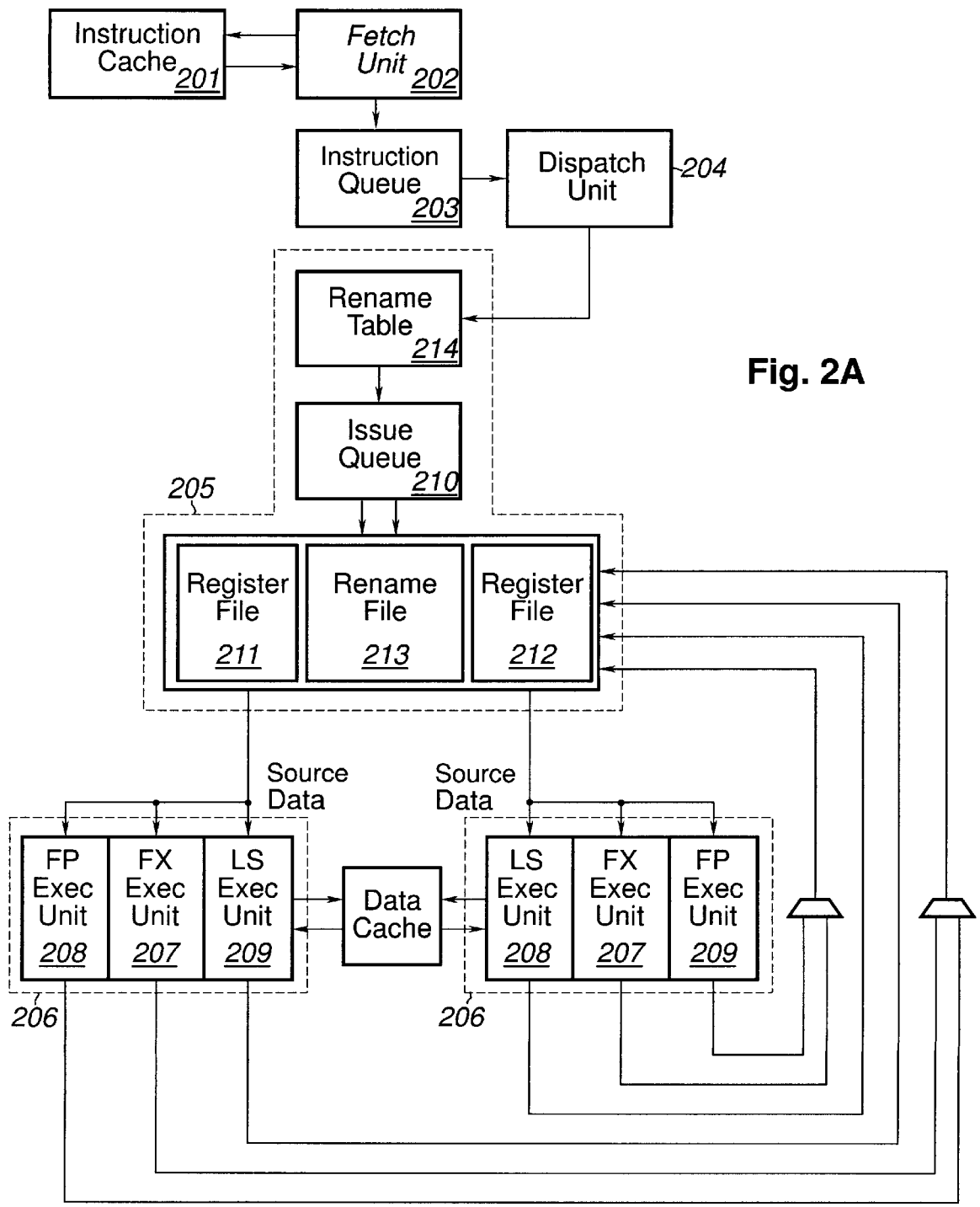
FIG. 2A illustrates, in block diagram form, an embodiment of a processor in accordance with the principles of the present invention.

Refer now to FIG. 2A in which is shown processor 200 according to principles of the present invention. Processor 200 includes I-cache 201, fetch unit 202, dispatch queue 203 which operate in similar fashion to data processor 100 in FIG. 1. However, in data processor 200, dispatch unit 204 dispatches instructions from instruction queue 203 into a single issue pipeline 205.

Issue pipeline 205 may receive multiple instructions from dispatch unit 204 in a single cycle. Dispatch unit 204 may dispatch multiple instructions in a single cycle so as to maintain a filled issue pipeline 205. Moreover, dispatch unit 204 may, in the same cycle, dispatch multiple instructions of different types, such as one or more fixed-point instructions and one or more floating point instructions. Thus, issue pipeline 205 may service instructions of both fixed-point type and floating point type, along with their corresponding operand types, as well as load/store instructions.

Data processor 200 includes a plurality of general execution units 206. Each of general execution units 206 includes a fixed-point execution engine 207, a floating point execution engine 208 and a load/store execution engine 209. Alternatively, execution engines 207–209 may be embodied as free-standing execution units, fixed-point unit 207, floating point unit 208 and load/store unit 209. Instructions are issued to each of general execution units 206 from issue queue 210. Issue queue 210 may contain instructions of floating point type, fixed-point type and load/store instructions.

Instructions may be issued out-of-order by issue queue 210. An instruction may be issued to one of general execution units 206 as soon as the source operands of the instruction are available. If the instruction generating the source operand has completed, the instruction requiring the source operand obtains the operand from one of architected register files 211 and 212. One of register file 211 and register file 212 may be operable for storing data values of floating point type, and the other of register files 211 and 212 may be operable for storing data values of fixed-point type.

If, however, a source operand has been generated by an instruction finished but not completed, the dependent instruction obtains the source operand from a register in rename buffer 213. Rename buffer 213 renames both register file 211 and register file 212 and is operable for storing both floating-point data values and fixed-point data values. In this way, a plurality of instructions may be processed out-of-order without unnecessarily duplicating temporary storage. When the instruction generating the source operand completes, the operand is written back from the register in rename buffer 213 containing the operand, to the corresponding architected register in register file 211 or register file 212, as appropriate.

The association between a register in rename buffer 213 and an architected register in one of register files 211 and 212 is made through rename table 214. In addition to mapping logical register addresses to physical register numbers, rename table 214 also includes a tag to associate the mapping between the architected register logical address and the rename buffer register with the corresponding one of register file 211 and register file 212. Rename table 214 is illustrated in more detail in FIG. 2B.

Rename table includes a plurality, N, of entries 220. N is a predetermined number of entries 220. Each entry 220 includes a plurality of fields. T-field 222 includes a data value for signaling whether an associated entry in rename register file 213 renames a floating point value or a fixed-point value. A. preselected first data value in T-field 222 may correspond to a floating point value and a second predetermined value to a fixed-point value. Register ID field 224 includes an index data value that associates the corresponding entry in register files 211 and 212 with the respective entry 220. The appropriate one of register 211 and 212 is signaled by the value in T-field 222. V-field 226 contains a first predetermined validity data value when the source data value corresponding to the respective entry 220 has been committed to the appropriate one of architected register files, 211 and 212. The appropriate register file is determined by the data type, floating point or fixed-point, and signaled by the value in T-field 222.

Rename table 214 is accessed when an instruction is dispatched from queue 203. It is accessed to determine the status of source operands, and an entry is assigned to rename any target operand associated with the instruction.

The dispatched instruction is loaded into issue queue 210. Issue queue 210 is illustrated in further detail in FIG. 2C, and includes a plurality. M, of entries 230. An entry 230 is associated with each source and destination operand for each queued instruction. A portion of each entry includes instruction control information to control a target execution unit, such as one of execution units 207–209. These have not been illustrated, for simplicity. The operand type, floating point or fixed-point, is signaled by a data value in T-field 232. A data value associating the operand with an architected register is contained in register ID 234. Rename ID 236 contains a data value associating the architected register value in register ID 234 with an entry in rename file 213. Rename file 213 includes a plurality, L, of entries 240 storing data values received from general execution units 206. In an embodiment of the present invention, the number L of entries 240 in rename file 213 may be the same as the number N of entries 220 in rename table 214.

When an instruction's operand data becomes available, the instruction may be issued to an appropriate one of execution engines 207–209. The instruction accesses a register file for the source operand as it is issued. If the target instruction providing the source operand data has completed, the operand is obtained from FPR file 211 if the operand is a floating point value and from GPR file 212 if the operand is a fixed-point value. If the target instruction has not completed the operand value is retrieved from the corresponding entry 240 in rename file 213. When the target instruction completes a preselected data value is set in the V-field 238 in entry 230 of issue queue 210 corresponding to the source operand. The preselected data value signals the issuing instruction to retrieve the source operand from the appropriate architected register, FPR file 211, or GPR file 212, rather than rename file 213. On completion of the target instruction, the source operand also is moved from rename file 213 to FPR file 211 for a floating point value or GPR 212 for a fixed-point value, and the corresponding entry 240 in rename file 213 is released. Rename table 214 is updated with a preselected data value set in V-field 226 in the corresponding entry 220 to signal instructions dispatching from dispatch queue 203 that the corresponding source operand is available from the appropriate one of architected registers 211 and 212.

Although register files 211 and 212, and rename buffer 213, have been described in the context of instruction operand data storage, a rename mechanism according to the principles of the present invention may be used in other contexts. In the context of operand data storage, one of register files 211 and 212 may be a general purpose register (GPR) and the other a floating point register (FPR). However, a unified rename buffer, such as rename buffer 213, may be used to rename a plurality of other architected registers such as a condition register (CR), a link register (LR) and a count register (CTR). It would be understood by one of ordinary skill in the art that the renaming mechanism for architected registers such as these would operate in the same fashion as the unified renaming described hereinabove with respect to register files for storing instruction operand data values.

Figure 3:
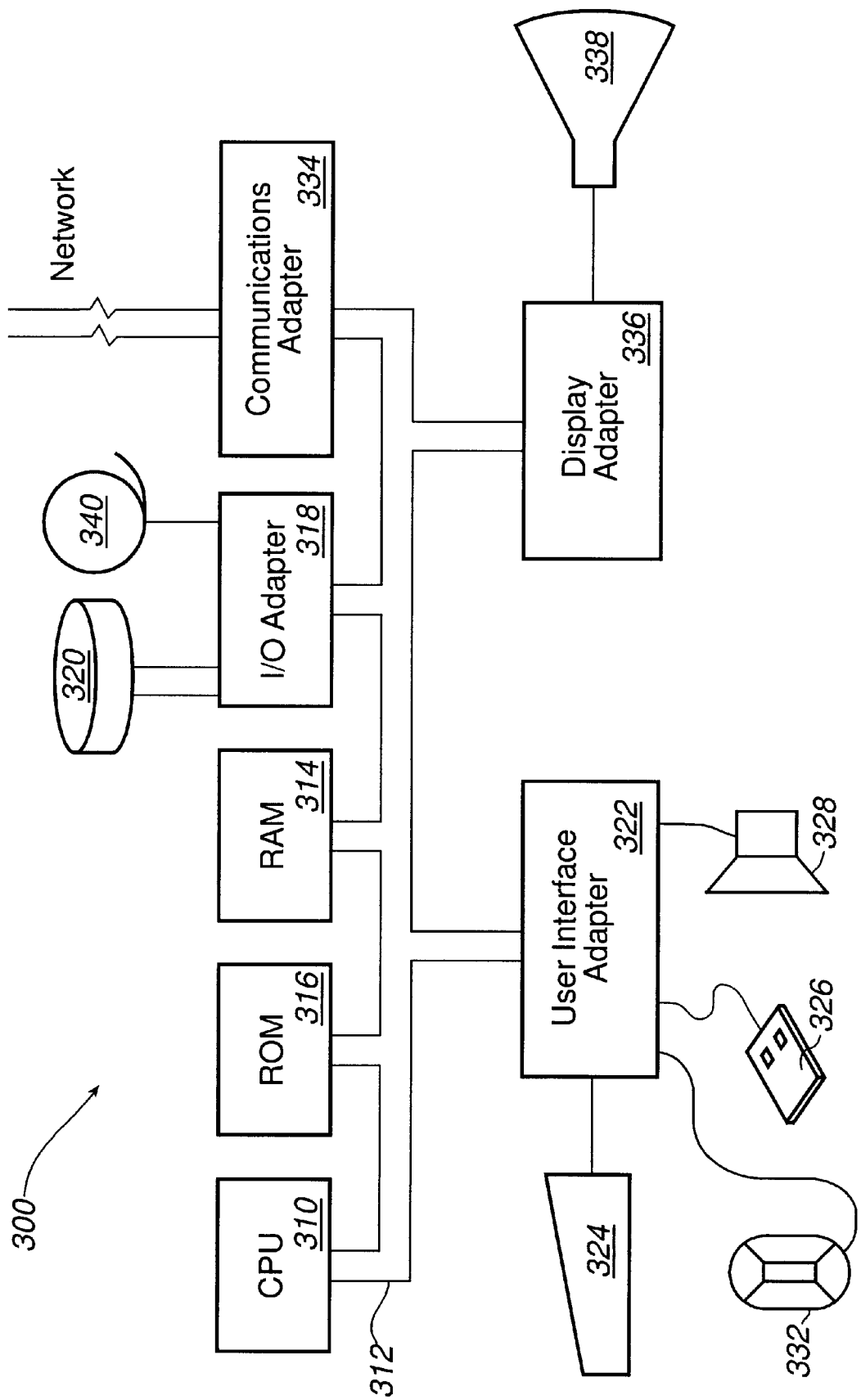
FIG. 3 illustrates a data processing system in accordance with an embodiment of the present invention.

Referring first to FIG. 3, an example is shown of a data processing system 300 which may be used for the invention. The system has a central processing unit (CPU) 310. The rename mechanism of the present invention is included in CPU 310. The CPU 310 is coupled to various other components by system bus 312. Read only memory ("ROM") 316 is coupled to the system bus 312 and includes a basic input/output system ("BIOS") that controls certain basic functions of the data processing system 300. Random access memory ("RAM") 314, I/O adapter 318, and communications adapter 334 are also coupled to the system bus 312. I/O adapter 318 may be a small computer system interface ("SCSI") adapter that communicates with a disk storage device 320. Communications adapter 334 interconnects bus 312 with an outside network enabling the data processing system to communication with other such systems. Input/Output devices are also connected to system bus 312 via user interface adapter 322 and display adapter 336. Keyboard 324, track ball 332, mouse 326 and speaker 328 are all interconnected to bus 312 via user interface adapter 322. Display monitor 338 is connected to system bus 312 by display adapter 336. In this manner, a user is capable of inputting to the system throughout the keyboard 324, trackball 332 or mouse 326 and receiving output from the system via speaker 328 and display 338. Additionally, an operating system such as AIX ("AIX" is a trademark of the IBM Corporation) is used to coordinate the functions of the various components shown in FIG. 3.

Although the present invention and its advantages have been described in detail, it should be understood that various changes, substitutions and alterations can be made herein without departing from the spirit and scope of the invention as defined by the appended claims.

What is claimed is:

1. An apparatus for renaming a plurality of storage devices comprising:
   a first register file containing a plurality of first entries;
   a second register file containing a plurality of second entries;
   a rename file containing a plurality of third entries, wherein each third entry is operable for association with an entry in one of said first register file and said second register file; and
   a rename table for associating a preselected one of said plurality of third entries with said preselected entry in a preselected one of said first and second register files.

2. The apparatus of claim 1 wherein said first register file is operable for storing an instruction operand.

3. The apparatus of claim 2 wherein said second register file is operable for storing an instruction operand.

4. The apparatus of claim 1 wherein said rename table further comprises a plurality of entries and wherein each entry has a portion containing a data value operable for associating a preselected one of said third entries with one of said first and second entries.

5. The apparatus of claim 1 wherein said rename table further comprises a plurality of entries and wherein each entry has a portion containing a data value associating a preselected one of said third entries with a preselected one of said first and second entries.

6. The apparatus of claim 1 wherein said rename table further comprises a plurality of entries, each entry having a portion operable for selecting one of said first and second register files.

7. The apparatus of claim 1 further comprising an instruction queue, said instruction queue including a plurality of entries wherein each said entry contains a portion operable for selecting one of said first and second register files.

8. A method of multiple register renaming comprising the steps of:
   selecting for accessing one of a first register file and a second register file in response to a predetermined data value;
   associating a preselected entry in a rename file having a plurality of entries with a preselected entry in said one of said first and second register files from said selecting step; and
   storing said data value in a portion of a preselected entry in a rename table, wherein said rename table includes a plurality of entries, each entry corresponding to one of said entries in said rename file and wherein said data value is operable for accessing one of said first register file and said second resister file.

9. The method of claim 8 further comprising the step of storing a data value in a portion of an entry in an issue queue, said issue queue including a plurality of entries, and wherein said data value is operable for accessing one of said first register file and said second register file.

10. The method of claim 8 further comprising the step of accessing one of said first register file and said second register file in response to a predetermined data value in said portion of said preselected entry in said rename table.

11. The method of claim 8 further comprising the step of accessing one of said first register file and said second register file in response to a predetermined data value in said portion of said entry in said issue queue.

12. A data processing system comprising:
   an instruction queue adapted for receiving a plurality of instructions from a memory device;
   a dispatch queue for sending an instruction from said instruction queue to an execution unit for execution; and
   a rename mechanism for associating a temporary storage device for receiving a data value connected with said instruction with an architected storage register for receiving said data value, said rename mechanism comprising:
      a first register file containing a plurality of first entries;
      a second register file containing a plurality of second entries, wherein a portion of each of said first and second entries is operable for receiving an operand value associated with an instruction in said plurality of instructions;
      a rename file containing a plurality of third entries, wherein at least one said third entry is associated with a preselected entry in a preselected one of said first register file and said second register file, and wherein said preselected entry is operable for receiving an operand value therefrom; and
      a rename table for associating a preselected one of said plurality of third entries with said entry in a preselected one of said first and second register files.

13. The data processing system of claim 12 wherein said first storage register file is a fixed-point register file, and said second register file is a floating point register file.

14. The data processing system of claim 12 wherein said data value is accessed in response to a conditional state of said instruction.

15. The data processing system of claim 12 wherein said first storage register is a link register (LR).

16. The data processing system of claim 12 wherein said first storage register is a condition register (CR).

17. The data processing system of claim 12 wherein said first storage register is a count register (CTR).

18. The data processing system of claim 12 further comprising an instruction queue, said instruction queue including a plurality of entries wherein each said entry contains a portion operable for selecting one of said first and second register files.

19. The data processing system of claim 12 wherein said rename table further comprises a plurality of entries and wherein each entry has a portion containing a data value associating a preselected register one of said first and second register entries with a preselected one of said third register entries.

* * * * *